Oct. 22, 1946. G. D. WEBBER 2,409,817
GAUGE
Filed Jan. 10, 1945 2 Sheets-Sheet 1
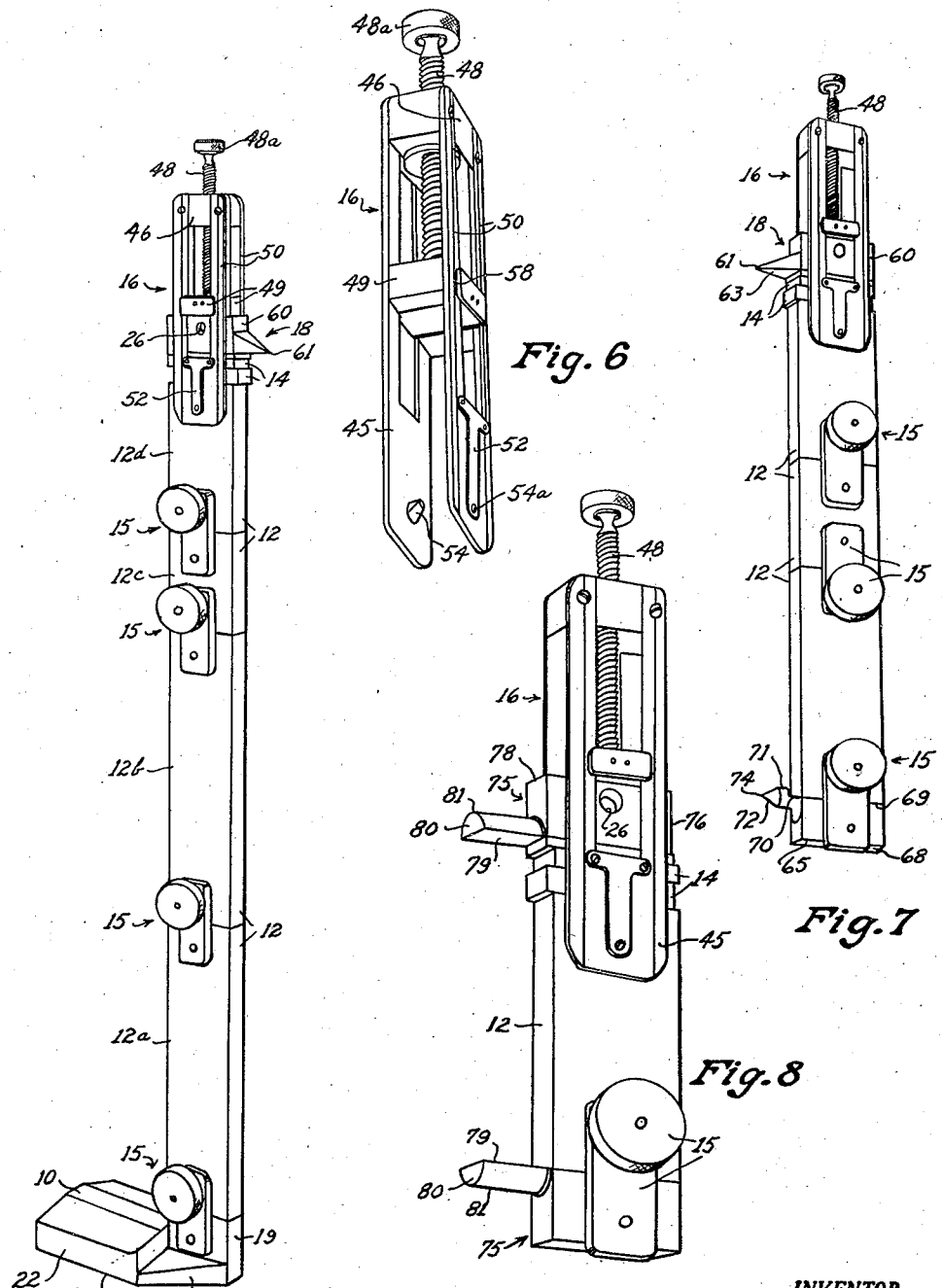
INVENTOR.
George D. Webber
BY
ATTORNEY Oct. 22, 1946. G. D. WEBBER 2,409,817
GAUGE
Filed Jan. 10, 1945 2 Sheets-Sheet 2
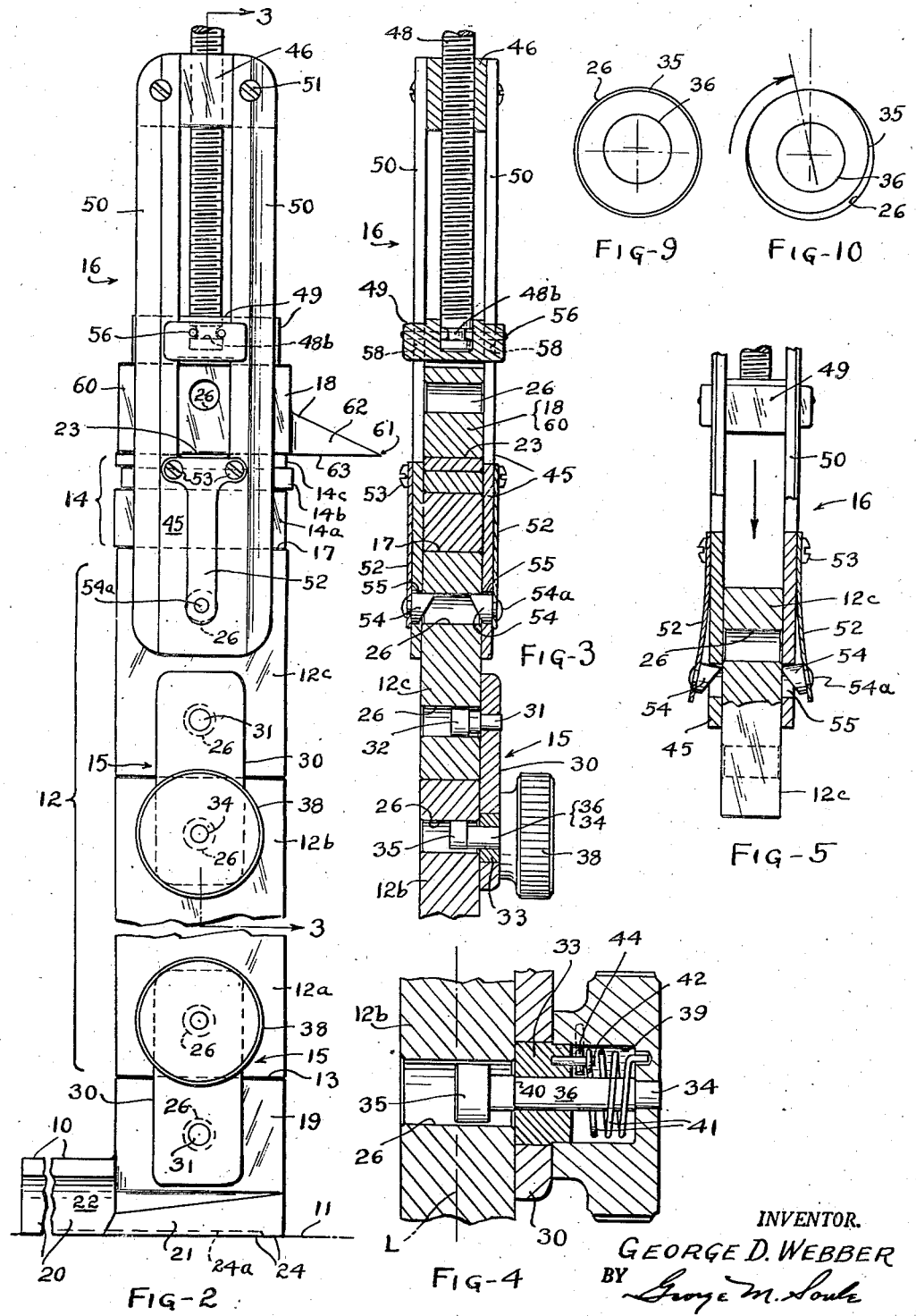
INVENTOR.
GEORGE D. WEBBER
BY George M. Soule
ATTORNEY Patented Oct. 22, 1946

2,409,817

UNITED STATES PATENT OFFICE 2,409,817

GAUGE

George D. Webber, Lakewood, Ohio

Application January 10, 1945, Serial No. 572,109

22 Claims. (Cl. 33—168)

This invention relates to an instrument for measuring and/or indicating dimensions and more specifically to a gauging instrument including a plurality of accurately formed gauge blocks and one or more cooperating devices adapted to be combined in various arrangements for very accurately measuring inside or outside dimensions or indicating, as by scribing a line, preselected heights above or otherwise spaced from a reference surface.

High precision gauge blocks in sets are in general use. The blocks of a set have opposing parallel substantially flat measuring faces, hereinafter referred to for convenience as end faces spaced apart very accurately at predetermined progressively varying distances. The transverse dimensions of all of the blocks are usually the same. The sets include blocks having lengths which are usually decimal fractions of an accepted unit of length such as the inch or centimeter and may include blocks having lengths which are integral multiples of such unit. The different classes of blocks may thus be identified, for discussion, as "integral" and "non-integral" or fractional blocks. By stacking selected blocks of the set in end-to-end relationship, composite gauging structures having lengths variable in steps of the order of thousandths or ten-thousandths of an inch may be secured, the size of the steps and the possible maximum and minimum overall lengths being dependent upon the number and size of the blocks in the set.

For most purposes the individual blocks of a composite gauge structure such as described above are merely wrung together, but for measuring or indicating distances between relatively remote points, as above a surface plate or for measuring between, e. g., horizontally spaced points, as for checking internal diameters during formation on a grinder, the instability of this method of assembly renders it desirable that the blocks be more securely but detachably fastened together. Prior fastening or coupling means of the type which required screws to be passed through or into each block used in the instrument have many disadvantages. For example, interruption of the measuring or end surfaces by holes obviously is objectionable; excessive time is required to assemble and disassemble the instrument; a tool such as a screw-driver and which is apt to damage the finish of the blocks must be used with the blocks, and all of the blocks of the set, including the fractional or non-integral blocks, must be specially formed to cooperate with the fastening means. Prior general purpose coupling means which might have been used in place of the central coupling screws are not satisfactory for use in rigid composite measuring instruments of the types shown hereby, either because of undue complexity or because they would tend to tilt contiguous blocks out of alignment instead of urging them together with forces entirely normal to the mutually contacting faces.

An object of this invention is to provide a gauge instrument of the above indicated character which has none of the foregoing disadvantages.

In accordance with this invention, a composite gauge structure is provided in which the individual gauge blocks are securely held together by improved coupling means. One type of improved coupling means includes a rotatable eccentric pin received in a cooperating transverse opening in a gauge block, mounting base or work contacting member of the set, and permits a pair of gauge blocks to be secured together and/or to such mounting base or member by a wedging action resulting from the mere turning of a knob out of a normal position in which the knob is held by a spring, and without the use of tools. The coupling means having the eccentric pin is particularly suitable for securing together gauge blocks of relatively large lengths, e. g. lengths which are integral multiples of an inch although useable for shorter lengths; and one or more couplings may be used to build up a rigid composite gauge structure to a height or length somewhat less than that desired. Such integral blocks, except for a base block, differ from standard blocks of integral length only in that each of the integral blocks of the improved gauge structure is provided with a vertically spaced pair of transverse openings.

Another type of coupling means in accordance with this invention is arranged to cooperate with a transverse opening in an end integral block of the composite structure just described to secure thereto one or more relatively short gauge blocks, e. g. having lengths which are fractional parts of an inch; and to secure a work contacting or distance indicating member in place on the composite structure. The shorter or non-integral blocks are preferably of conventional design without openings and are used to build up the composite structure to the desired length or height when such distance is not an integral dimension. Said other type of coupling means hereof may take the form of a screw clamp; and in addition to its function of holding the integral and non-integral blocks together in end-to-end relationship, it is used as one manner of fastening a scriber, feeler, center point or other work-contacting or distance indicating instrument to the gauging structure.

A further object of this invention includes provision of a measuring instrument comprising a plurality of gauge blocks, bars or other precisely formed distance pieces detachably held together in an improved manner.

Another object is to provide a distance measuring instrument comprising a selectable number of integral and non-integral gauge block elements and a work contacting element or indicator held together by simple readily releasable coupling means.

Another object is to provide a gauging instrument comprising a pair of gauge blocks or distance pieces held together by a readily releasable coupling means operable by a wedging and/or clamping action which tends to maintain the blocks in true alignment and at uniform pressure throughout this area of mutual contact.

A further object is to provide a gauging instrument comprising a plurality of stacked gauge blocks or distance pieces with provision to releasably hold laterally projecting members of various types applicable to reference surfaces, work surfaces and the like for gauging operations of the various kinds required in machine shop practice.

Still another object is to provide a height gauge comprising a plurality of gauge blocks, some of which blocks are held together by a coupling means operable by a wedging action and some of which blocks are held together by a coupling means operable by a clamping action.

Other objects and advantages of the invention will become apparent from the following description of the preferred forms shown in the accompanying drawings. The essential characteristics are summarized in the claims.

In the drawings:

Fig. 1 is a perspective view of the instrument arranged to serve as a height gauge and line scriber;

Fig. 2 is a fragmentary side elevation of approximately the arrangement according to Fig. 1;

Fig. 3 is a fragmentary longitudinal sectional view taken substantially along the line 3—3 of Fig. 2;

Fig. 4 is an enlarged sectional detail of one end portion of a block coupling device shown by Figs. 1, 2 and 3;

Fig. 5 is a fragmentary view on the order of Fig. 3, showing a screw operated coupling device in the process of being disconnected from an associated block element;

Fig. 6 is a perspective view of the screw operated coupling device;

Figs. 7 and 8 are perspective views showing the gauge instrumentalities hereof arranged to serve as a precision divider and general purpose gauge, respectively; and Figs. 9 and 10 are diagrammatic views showing the operation of an eccentric locking and clamping mechanism according to Figs. 2, 3 and 4.

An illustrative height gauge in accordance with this invention, and as shown by Figs. 1 and 2, comprises a base block 10 adapted to rest on a surface plate 11 (Fig. 2), a plurality of relatively long (integral) gauge blocks 12, marked 12a, 12b, 12c, etc., mutually stacked in end-to-end relationship and supported on a flat top surface 13 of the base block 10, and a plurality of relatively short (non-integral) gauge blocks 14, marked 14a, 14b, and 14c. The non-integral blocks are mutually stacked in end-to-end relationship and are supported on a top surface 17 of the uppermost integral gauge block (12d Fig. 1, 12c Fig. 2). The opposing horizontal surfaces of each of the gauge blocks are finished as by lapping to extreme flatness, are accurately spaced apart within limits of a few millionths of an inch, and are in true parallelism as known in the art of making high precision gauge blocks. It is to be understood that any suitable number of integral and non-integral gauge blocks may be used, and, as will become apparent hereinafter, one or more of the relatively long blocks may be substituted for some of the relatively short blocks.

The block 12a is detachably secured to the base block 10 and the blocks 12b, 12c, etc., are detachably secured together by coupling devices 15 which are applicable selectively at opposite faces and ends of the blocks 12. The blocks 14, which may be unaltered gauge blocks of a standard set of appropriate horizontal size, are detachably secured together in stacked relation and to the top integral block 12 by a coupling device or unit 16 which also detachably holds an indicating, measuring or other work-contacting block, shown in Figs. 1 and 2 as a scriber 18, in operating position on the top surface 23 of the uppermost block 14.

In Figs. 1 and 2, the base block 10 comprises an upright gauge portion 19, an integral buttress portion 20 of lesser height and of greater transverse dimensions than the portion 19, and a pair of opposed connecting and stiffening webs 21. Opposite side faces 22 of the portion 20 may be somewhat concave as shown to provide thumb and finger holds arranged to facilitate handling of the base and the gauge assembly. The bottom face 24 of the base is generally flat, but may be recessed, inwardly from the margins, as suggested by a dotted line at 24a in Fig. 2.

The top surface 13 of the gauge portion 19 is a gauging surface and is finished with extreme accuracy so as to be parallel with and a predetermined distance from the finished portion of the bottom surface 24. An accurately positioned and formed transverse cylindrical opening 26 in the gauge portion 19 is provided for cooperation with one of the coupling devices 15 or directly with the coupling device 16 in case a comparatively low-height gauge is desired.

Although the gauge blocks 12 and 14 may be and usually are each of a different height, said blocks have transverse dimensions which are substantially equal to the corresponding transverse dimensions of the gauge portion 19 of the base block 10. Although the gauge portion 19 and the blocks 12 may have any suitable vertical lengths, it is preferred, if the inch or centimeter is used as the measuring unit, that the height of the blocks 12 and of the portion 19 be integral multiples of the unit. Thus the base block 10 and a minimum number of gauge blocks 12 may be used to form a composite structure having a height somewhat less than a non-integral height or distance to be measured, or exactly equal to an integral height or distance to be measured.

The gauge blocks 12 are each provided with a pair of vertically spaced, cylindrical openings 26, preferably through openings as shown, which are very accurately formed and which have their respective axes parallel to and spaced equidistantly from their respective nearest adjacent gauging surfaces. The opening 26 in the base block 10 (see Fig. 2) is similarly disposed with respect to the surface 13. Thus, when the blocks 10 and 12 are stacked as shown, the opening 26 in the base block 10 is spaced a predetermined distance from the lowermost opening in the block 12a and the uppermost opening in the block 12a (not shown) is spaced exactly the same distance from the lowermost opening 26 (not shown) in the block 12b. The blocks 12 can all be inverted, that is, used interchangeably end for end. When inverted, the same spacing between adjacent openings of contiguous blocks results.

Each of the coupling devices 15 comprises a tension member or tie plate 30 provided with a pair of vertically spaced openings (Figs. 3 and 4) into one of which is pressed or rigidly secured a pin 31 having a nearly cylindrical head portion 32 and the other of which, through the intermediary of a bushing 33 pressed into the plate, rotatably receives a pin 34 having a nearly cylindrical head portion 35 and an elongated shank portion 36. A knurled knob 38 having an axial cylindrical cavity 39 is secured, as by a press fit, onto the outer reduced end of the shank 36. The inner wall surface of the cavity of the knob turnably fits an outwardly projecting portion of the bushing 22, and a shoulder 40 on the shank 36 cooperates with the inner end face of the bushing to prevent excessive endwise movement of the pin and knob assembly while enabling the assembly to turn freely. Surrounding the shank 36 within the cavity 39 is a coiled torsion spring 41 having one end received in a socket in the end wall of the cavity 39 or otherwise suitably fastened to the knob and the other end looped around a spring supporting pin 42 mounted by the bushing 33 and extending outwardly into the cavity parallel with the shank 36. The spring 41 normally biases the knob 38 and consequently the pin 34 to a predetermined turned position with respect to the plate 30 at which the spring supporting pin 42 is held against a radially extending stop pin 44 pressed into an opening in the knob. The stop pin may be inserted after the spring and bushing have been assembled into the cavity 39 and the knob has been turned relative to the bushing, in a clockwise direction as viewed in Fig. 2, to stress the spring the desired amount.

The head 32 of the fixed pin 31 is coaxial with respect to its associated shank portion and has a diameter slightly less than the diameter of the block openings 26 into which it is receivable interchangeably with a free sliding fit. The head 35 of the pin 34 has a diameter somewhat less than the diameter of the openings 26, for example less than the diameter of the head 32, and has its axis parallel to but displaced slightly from the axis of the shank 36 as shown in greatly exaggerated fashion in Figs. 9 and 10. The degree of eccentricity between the two axes may be of the order of 0.003 of an inch or less. When the pin 34 is in its normal turned position with respect to the plate 30, i. e. with the spring support 42 against the stop 44, the respective axes of the heads 32 and 35 are so spaced apart that the heads may be freely received respectively into associated openings 26 (e. g.) of adjacent blocks 12 having their end faces in full contact. The heads 32 and 35 (35 shown in Fig. 4) are slightly frustoconical with the larger ends disposed away from respective supporting pins. When the plate 30 is in engagement with the side wall surfaces of a pair of contiguous blocks 12 or a block 12 and base portion 19, the larger diameter portions of the heads 32 and 35 are nearly centrally disposed axially of the openings 26 into which they are respectively received. Thereby the centers of pressure of the heads 32 and 35 on the associated blocks at the openings are centrally of the blocks in the directions of extent of the openings, as along axial reference line L, Fig. 4, and there is therefore no tendency for the connected blocks to tilt out of mutual parallelism or alignment or to be displaced horizontally. Fig. 10 shows the wedging action of the eccentric head 35 of the connector for blocks 12b and 12c following a turn of the knob 38 from normal stopped position and in the direction of the arrow. Note that the wedging occurs before the eccentric head reaches its maximum wedging-force-exerting position.

After a coupling device 15 is placed in operating position with the heads 32 and 35 of the pins 31 and 34, respectively, received in adjacent openings 26, respectively, of a contiguous pair of gauge blocks, turning of the knob 38 and consequently the pin 34 a partial turn in a clockwise direction (Figs. 2, 9 and 10) moves the stop 44 away from the spring support 42 against the bias of the spring 41 and causes the head 35, due to its eccentricity, to force against the wall of the opening 26 into which it is inserted and toward the head 32. This pressure causes the pair of contiguous blocks to be forced tightly together and to be held in that position. The wedging action of the head portion 35 against the wall of the opening 26 not only holds the contiguous blocks tightly together, but also serves to prevent return of the knob 38 to its initial position by the action of the spring 41 alone. However, a small counterclockwise turning movement exerted on the knob 38 by an operative's fingers readily releases the head portion 35 from its wedging position, the spring 41 then returning the pin 34 to its normal turned position with respect to the plate 30. Since the pressure portions of both the head 32 and the head 35 are centrally disposed transversely of the blocks in horizontal directions at right angles to all four vertical faces of the connected blocks, there is no turning moment exerted on the blocks by the wedging action. Also, since the heads 32 and 35 never project more than half-way through the associated openings 26, a single hole 26 may be effectually occupied by the connecting heads of different connectors 15 on opposite sides of a single block. (The shortest integral block—a one-inch block for example—has only one hole 26.)

From the foregoing description, it is apparent that a plurality of gauge blocks such as the gauge blocks 10 and 12 can be quickly, accurately, and securely fastened to each other in end-to-end relation to form a rigid composite gauging structure having either a desired integral height or being slightly shorter than a desired non-integral height. If an integral height is to be measured, the coupling device 16 may be used in a manner to be described to hold the scriber 18 or similar device directly on the uppermost surface 17 of the stack of relatively large-sized gauge blocks, whereas, if a non-integral height is to be measured, the coupling device 16 may in addition hold one or more of the relatively small gauge blocks 14 between (e. g.) the scriber 18 and the top of the stack of integral blocks. The stack of blocks 10 and 12 can of course be used as a height gauge without any top connector 16 with for example blocks 14 on top (wrung together and against the surface 17 of the uppermost block 12).

The coupling device 16, as most clearly shown by Figs. 2, 3 and 6, comprises a pair of U-shaped metal side members 45, a top connecting block or yoke member 46 into which a clamping screw 48 is threaded, and a clamping jaw 49 connected with the screw and slidable along the side members. The screw has a knurled head portion 48a above the yoke. The side members 45 have pairs of spaced leg portions 50 secured to the block 46 at suitable corner notches of the block as by screws 51. The clamping jaw 49 is rotatably secured for swivelling relative movement to a reduced lower end portion of the screw 48 as by parallel cross pins 56 on the jaw lying partly in a peripheral groove 48b of the screw. The jaw 49 has opposed pairs of spaced slots 58 (Fig. 6) which slidably receive the legs 50, respectively, of the side members 45. Upon turning of the screw 48 it is apparent that the jaw 49 moves longitudinally as guided by the legs 50.

The lower or bight portions of the side members 45 are spaced apart substantially the width of the gauge blocks 12 and 14 and the block portion of the scriber 18 and are provided with spring biased movable latch pins 54 extending toward each other for detachable engagement with the transverse openings 26 of the larger blocks 12 when one of the latter is positioned between the side members 45. As shown, the pins 54 are carried on T-shaped leaf spring members 52 secured to respective side members 45 as by screws 53. The pins 54 may be riveted to the respective springs as at 54a (see Fig. 3), and the inner ends or head portions of the pins slidably extend through openings 55 in the side members for engagement and disengagement with the holes 26. The supporting springs limit the movement of the pins toward each other as will be clear from inspection of Fig. 3. The head portions of the pins as shown in Figs. 3 and 5 comprise acutely truncated cylinders, the longer upper sides of which normally extend inwardly considerably beyond the inner faces of respective side members 45, and the shorter lower sides of which do not extend inwardly through or at least beyond the openings 55.

It will be apparent from the above that when the side members 45 are slid endwise over the uppermost block 12 (12c in Figs. 2 and 3) the inner beveled faces of the latch pins 54 are cammed outwardly by the upper corners of said top block adjacent respective main side faces of the block, and that when the pins register with the opening 26 of said top block, the pins snap into place. The pins when in seated position may substantially fit the openings 26 so that the lower end of the device 16 is centered relative to the top block 12.

After the proper number and size gauge blocks 14 are stacked in end-to-end relationship on the surface 17 (Figs. 2 and 3) and between the members 45 to reach a desired height above the surface 17, the scriber 18, for example, is placed on the top surface 23 of the uppermost short block 14c and the screw 48 turned so as to force the jaw 49 against the top of the scriber thereby to clamp the blocks 14 as well as the scriber securely to the block 12c.

The body 60 of the scriber 18 preferably has the same transverse dimensions as the gauge blocks 12 and 14 and a height somewhat greater than the distance from the holes 26 of the blocks 12 to the nearest end faces of respective blocks. The wear resisting sharp point 61 of the scriber is formed on a right triangular projection 62 of the scriber body. The bottom face 63 of the body and projection 62 is an accurately finished flat surface in the plane of the scriber point. The body 60 has a transverse hole 26 accurately located a distance above the face 63 corresponding to the distance of the other holes 26 from adjacent end faces of the blocks 12 in which they are formed so that the scriber can be mounted at either end of the instrument (cf. Fig. 7). The edge 61 may be used to scribe a line on an article being gauged or set up for marking on the surface plate 11 in a well known manner. The lower edge of such scribed line is exactly the same height above the surface plate 11 as is the surface 23 of the top non-integral gauge block 14. Alternatively, the lower side 60 of the scriber may be used as a measuring face to make contact with a piece to be checked for height thereof above the surface plate.

Because the lower portions of the bevel faces of the pins 54 do not enter the upper opening 26 of the top block 12, the coupling device 16 may be detached from said top block, or any other block 12 to which connected, by inward movement of the coupling device 16 endwise along such block, as brought out by Fig. 5. The detaching operation is accomplished after the non-integral blocks 14 and (e. g.) the scriber 18 have been removed from beneath the clamping jaw and (with the particular arrangement shown by Figs. 2 and 3) after the blocks 12b and 12c have been disconnected from each other. The pins are cammed outwardly by the lower edge wall surfaces of the engaged opening 26, thereby enabling the top block 12 to be slid out from between the side members 45 in a direction parallel to the principal planes thereof for complete disconnection without having to manipulate the pins 54 or their supporting springs.

The scriber 18 is one of a set of special blocks including block 65, 75 and others if desired (see Figs. 7 and 8), each of which has a measuring or indicating point or face corresponding generally to the face 63 and point 61 of the scriber and each of which preferably has an opening 26 to cooperate with the connectors 15. Thus each special block may be used at either end of the instrument constituted by the rigid assemblage of blocks 12 (or 12 and 14) and their connectors.

The member 65 of Fig. 7 is a center point indicator or marker having a body portion 66 of the same transverse dimensions as the gauge blocks and provided with a flat face 68 for engagement with the jaw 49 and an opposite accurately finished face 69 for engagement with a gauging surface such as the end face of any of the blocks 12 or the exposed end face of a block 14. The body portion 66 has a hole 26. A neck portion 70 of the center point indicator or marker 65 terminates in a cylindrical head portion 71 which has a conical face 72 defining a hard and wear resisting point 74. The point 74 is usable for marking a center or engaging a prick punch socket for example and lies in the same plane as the face 69 so that a mark made or center socket engaged by the point 74 is exactly the desired distance from a reference position such as established by the surface plate 11 when the center point block 65 is used for example in place of the scriber 18 in the assembly according to Figs. 1 and 2. In Fig. 7 the scriber point 61 and center point 74 cooperate to provide a high precision divider. The manner of mounting the members 18 and 65 interchangeably at opposite ends of the assembled blocks 12 and 14 will be clear from the showing and foregoing description.

Each of the caliper jaw blocks 75 shown in Fig. 8 comprises a body portion 76 similar to the body portion 60 of the scriber 18 and having outer and inner face surfaces 78 and 79, respectively, the latter being precision finished for engagement with the respectively adjacent end faces of the stacked gauge blocks 12 or 14. The body portion 76 of each caliper jaw has a hole 26 precisely related to the face 79. A projecting portion 80 of each caliper jaw block is cut away to define a half-cylindrical jaw having the surface 79 as its planar wall and a curved surface of very accurate radius parallel to said wall. When the caliper jaw block is substituted for the scriber 18 for example of Figs. 1 and 2, the portion 80 projects outwardly from between the side members 45, and either the top of the portion 80 or the bottom face is usable in a well known manner as a gauging element. The two caliper jaws 75 of Fig. 8 cooperate with other portions of the instrument shown to provide an inside surface (e. g. diameter) checking gauge and/or an outside surface (e. g. diameter) checking gauge.

I claim:

1. A gauge comprising a pair of gauge blocks each provided with a gauging face surface and arranged with said surfaces in mutual contact, tension means secured to one of said blocks against movement toward the other of said blocks, means defining a curved surface on said other of said blocks which is concave in a direction away from said gauging surfaces, wedging means rotatably mounted by said tension means and having a convexedly curved surface substantially complementary to said concave surface, said curved surfaces normally being lightly in contact with each other or immediately adjacent to each other, and one of said curved surfaces being eccentric with respect to the axis of rotation of the wedging means so that said curved surfaces are forced tightly against each other upon rotation of said wedging means, thereby detachably to hold said gauging face surfaces in mutual contact.

2. A gauge comprising a pair of gauge blocks each provided with a gauging face surface and arranged with said surfaces in mutual contact, tension means secured to one of said blocks against movement toward the other of said blocks, means defining a circular arc surface on said other of said blocks which is concave in a direction away from said gauging surfaces, wedging means rotatably mounted by said tension means and having a circular arc portion eccentric with respect to the axis of rotation of said wedging means and substantially complementary to said first circular arc surface, said arc surfaces being normally so relatively positioned that upon rotation of the wedging means said arc surfaces are forced tightly together to hold said gauging surfaces in mutual contact.

3. A gauge comprising a pair of gauge blocks each provided with a gauging surface and arranged with said surfaces in mutual contact, cylindrical recesses in said blocks, respectively, each having an axis parallel to said gauging surfaces, a coupling means for said blocks comprising a rigid member mounting a pair of spaced pins generally complementary to and normally received in said recesses, respectively, one of said pins being mounted for rotation about an axis eccentric with respect to the axis of the receiving recess.

4. A gauge in accordance with claim 3 characterized in that said pins have reduced surface areas for contacting the walls of said recesses, respectively, and in that said reduced surface areas normally are immediately adjacent to the central longitudinal plane of at least one of said blocks, which plane is normal to the axes of said pins.

5. A gauge comprising, in combination, a pair of gauge blocks each provided with a flat gauging face and a side face, a cylindrical recess in each of said side faces, coupling means mounting a pair of spaced pins which are normally receivable with small clearance into said recesses, respectively, when said gauging faces are in contact with each other, one of said pins being mounted for rotation about an axis which is slightly eccentric with respect to the axis of the receiving recess.

6. A gauge comprising a pair of gauge blocks each provided with a gauging surface and a cylindrical recess, said recesses having axes which are parallel to said surfaces, respectively, coupling means including a pair of spaced pins having working portions substantially complementary to and normally receivable in respective recesses when said gauging surfaces are in face to face contact, one of said pins being mounted for rotation about an axis eccentric with respect to its associated working portion, the spacing of said pins and the degree of said eccentricity causing said working portions to be forced tightly against the side walls of the recesses, respectively, upon rotation of said one of said pins.

7. A gauge comprising in combination a pair of gauge blocks each provided with a flat gauging face and a side face, a recess in each of said side faces, coupling means mounting a pair of spaced pins which are normally freely receivable in respective recesses when said gauging faces are in contact with each other, one of said pins being mounted for rotation eccentrically with respect to its associated recess, and said pins being so spaced and the degree of said eccentricity being such that the rotatable pin wedges against a wall of the receiving recess consequent upon a partial rotation being imparted to said pin, whereby to force the gauging faces tightly together.

8. A gauge comprising in combination a pair of gauge blocks each provided with opposing parallel flat gauging faces at a predetermined precise distance apart and each having a pair of through holes having axes parallel to said gauging faces, each of said holes in each block being spaced equidistantly from the gauging face closest thereto regardless of the distance between the gauging faces, coupling means mounting a pair of spaced pins normally freely receivable in adjacent holes, respectively, on opposite sides of said gauging faces when said gauging faces are in contact, one of said pins being rotatably mounted about an axis displaced from the axis of its associated hole engaging surface portion, the displacement causing said rotatably mounted pin upon rotation to wedge against a side wall of its associated hole, whereby said blocks are held in face to face contract.

9. A gauge in accordance with claim 8 characterized in that one of said gauge blocks has an outwardly extending work engaging or distance indicating portion.

10. A gauge set comprising a plurality of elongated precision gauge blocks respectively having transverse openings at fixed distances from opposite ends of the blocks, tension clamps including pins adapted to enter the openings of adjacent blocks and having wedging means associated therewith arranged to force the blocks together endwise by engagement with the openings, and a supporting frame for receiving additional gauge blocks in stacked relationship, said frame having means to enter an opening of one of the first mentioned blocks, and clamping means spaced therefrom lengthwise of the assembled blocks, said two means of the frame cooperating to force the blocks which are in stacked relationship toward each other and toward the first mentioned blocks.

11. A height gauge comprising a pair of gauge blocks having gauging face surfaces in engagement, a tension member secured to one of said blocks against movement toward the other of said blocks, a cylindrical socket in said other of said blocks having an axis substantially parallel to said engaging faces and intersecting opposite side faces, a generally cylindrical pin received in said socket and mounted for rotation by said tension member, a head portion of said pin within said socket being eccentric with respect to the axis of rotation of said pin and normally making contact with the socket only approximately midway between the opposite side faces of the associated block intersected by the axis of the socket.

12. A gauge comprising in combination a pair of gauge blocks each provided with opposing parallel flat gauging faces at a predetermined precise distance apart and each having a pair of through holes having axes parallel to said gauging faces, each of the holes in each block being spaced equidistantly from the gauging face closest thereto regardless of the distance between the gauging faces, coupling means mounting a pair of spaced pins normally freely receivable in said holes of each block, respectively, when gauging faces of said blocks are in contact, one of said pins being eccentric with respect to its associated hole and mounted for rotation, and said eccentricity causing said rotatable pin upon rotation to wedge against a side wall of its associated hole, whereby said blocks are held in face to face contact.

13. A gauge comprising a main gauge block having an end face and a pair of opposing side faces, recesses in said side faces, respectively, a coupling device having a pair of opposing spaced leg portions depending from a yoke portion and adapted to engage the side faces of said main gauge block, respectively, retractable pins mounted at the free end portion of said leg portions, respectively, and disposed inwardly of said leg portions toward each other, said pins being complementary to said recesses, respectively, and receivable therein after retraction to permit said main gauge block to be slidably received between said leg portions, a jaw member adjustably mounted by said yoke and movable longitudinally of said leg portions, and one or more supplemental gauge blocks slidably received between said leg portions and between the end face of said main gauge block and said jaw member.

14. A gauge in accordance with claim 13 characterized in that said pins are provided with cam surfaces, respectively, positioned for engagement with corners of one of said gauge blocks to effect said retraction of said pins.

15. A gauge comprising in combination a main gauge block provided with a flat gauging face, a pair of substantially parallel side faces perpendicular to said gauging face, an aperture in said block opening into said side faces and having an axis parallel to said gauging face, a clamp member having a pair of opposed parallel arms depending from a yoke portion, each of said arms retractably mounting an inwardly disposed pin at its free end portion, said pins being generally complementary to said aperture and receivable in opposite ends thereof, respectively, by effecting a retraction of said pins and then permitting said pins to return to their normal position, an abutment portion adjustably mounted by said clamp member for movement longitudinally of said arms, and one or more supplemental gauge blocks each provided with opposing parallel flat gauging faces at a predetermined precise distance apart and disposed in stacked relation between the gauging face of said main gauge block and said abutment portion.

16. A coupling device for use in holding a plurality of gauge blocks in assembled relation, comprising a frame having a pair of spaced leg portions adapted to slidably receive said gauge blocks therebetween, a pair of opposing pins mounted by said frame at the free end portion of said legs and normally extending inwardly of said legs toward each other and movable transversely of said legs, means biasing said pins to said normal position, whereby said pins may enter complementary openings in a gauge block received between said legs, and a jaw member mounted by said frame between said leg portions and movable longitudinally of said leg portions for engaging the nearest surface of the gauge blocks which are received between said legs.

17. A coupling device in accordance with claim 16 characterized in that the inner end faces of said pins are acutely truncated cylinders to define opposing end faces which diverge longitudinally of said legs toward the free ends of said legs, the marginal areas of said end faces nearest the free end of said legs being normally spaced apart a distance greater than the distance between said legs.

18. A coupling device for securing a pair of gauge blocks in face to face contact and comprising a supporting member having a face surface adapted to engage aligned side faces of said blocks, a pair of pins mounted by said member and extending outwardly from said surface, one of said pins being mounted for rotation about an axis which is eccentric with respect to the axis of a circular portion of said pin which projects beyond said face surface, and means operatively interconnecting said rotatable pin and said supporting member for normally biasing said rotatable pin to a predetermined relative turned position with respect to said supporting member such that rotation of said rotatable pin causes the axes of the projecting portions of said pins to move relatively toward each other.

19. A coupling device for securing a pair of gauge blocks together in contiguous relationship to each other, which gauge blocks are each provided with a recess having a curved wall area, said coupling device comprising a pair of spaced pins each having a head portion of substantially circular form defining a curved surface area operatively complementary to said curved wall area, means including spring biasing means normally supporting said pins in spaced relation for free insertion into said recesses, respectively, when said blocks are contiguous to each other, the head portion of one of said pins being rotatable against the spring biasing force about an axis which is eccentric with respect to the axis of the associated head portion.

20. A coupling device for securing a pair of gauge blocks in face to face contact and comprising a supporting member having a face surface adapted to engage aligned side faces of said blocks, a pair of pins mounted by said member and extending outwardly from said surface, each of said pins having a frusto-conical head portion tapering inwardly toward said surface, and one of said pins being mounted for rotation about an axis which is eccentric with respect to the axis of its associated head portion.

21. A coupling device in accordance with claim 20 characterized in that means are provided for biasing said rotatably mounted pin to a predetermined relative turned position with respect to said supporting member such that rotation of said rotatably mounted pin against said bias causes said frusto-conical surfaces to move relatively toward each other.

22. A set of gauge blocks comprising a plurality of gauge blocks each having opposing parallel flat end faces disposed a precise distance apart, said distance being different for some of the different blocks of the set, some of the blocks of unequal length having a pair of spaced openings, the axes of which are parallel to each other and to the end face of the respective block, each of said axes being spaced an equal distance from its nearest adjacent end face regardless of the distance between the end faces of the blocks, and means for engaging said openings of adjacent blocks to hold the blocks together.

GEORGE D. WEBBER.